United States Patent [19]

Rossi Sebastiano et al.

[11] Patent Number: 5,826,425
[45] Date of Patent: Oct. 27, 1998

[54] METHOD OF AUTOMATICALLY INITIATING REGENERATION OF A PARTICULATE FILTER OF A DIESEL ENGINE WITH A RAIL INJECTION SYSTEM

[75] Inventors: Giovanni Maria Rossi Sebastiano, Turin; Silvio Canale, Collegno, both of Italy

[73] Assignee: C.R.F. Societa Consortile per Azioni, Orbassano, Italy

[21] Appl. No.: 776,121

[22] PCT Filed: Jul. 21, 1995

[86] PCT No.: PCT/IT95/00124

§ 371 Date: Jan. 22, 1997

§ 102(e) Date: Jan. 22, 1997

[87] PCT Pub. No.: WO96/03571

PCT Pub. Date: Feb. 8, 1996

[30] Foreign Application Priority Data

Jul. 22, 1994 [IT] Italy ................... TO94A0606

[51] Int. Cl.⁶ ........................................ F01N 3/00
[52] U.S. Cl. ...................... 60/274; 60/284; 60/285; 60/295
[58] Field of Search ............... 60/285, 284, 274, 60/300, 295, 303

[56] References Cited

U.S. PATENT DOCUMENTS

| | | | |
|---|---|---|---|
| 4,452,040 | 6/1984 | Kobashi | 60/274 |
| 4,509,327 | 4/1985 | Enga | 60/285 |
| 4,565,065 | 1/1986 | Kimura | 60/285 |
| 4,709,547 | 12/1987 | Pischinger | 60/285 |
| 5,207,058 | 5/1993 | Sasaki | 60/294 |
| 5,479,775 | 1/1996 | Kraemer | 60/274 |

FOREIGN PATENT DOCUMENTS

| | | |
|---|---|---|
| 0 070 619 | 1/1983 | European Pat. Off. . |
| 0 411 445 | 2/1991 | European Pat. Off. . |
| 0 621 400 | 10/1994 | European Pat. Off. . |
| 37 29 857 | 11/1988 | Germany . |
| 41 17 676 | 12/1991 | Germany . |

OTHER PUBLICATIONS

Patent Abstract of Japan, vol. 17, No. 558 (M–1493), 7 Oct. 1993 for JP 05–156993.

Primary Examiner—Thomas E. Denion
Attorney, Agent, or Firm—Evenson, McKeown, Edwards & Lenahan, P.L.L.C.

[57] ABSTRACT

An automatic regeneration initiating method presenting, in addition to the main injection phase, an auxiliary post-injection phase, for injecting a given quantity of fuel directly into the cylinders during the expansion stroke when the temperature in the combustion chamber is still high enough for its combustion, so as to increase the temperature of the exhaust gas and initiate combustion of the filtered particulate. By appropriately regulating the amount of fuel injected and the timing of the post-injection phase, incomplete combustion products are formed for assisting combustion of the dry particulate and lowering its ignition temperature.

20 Claims, 2 Drawing Sheets

METHOD OF AUTOMATICALLY INITIATING REGENERATION OF A PARTICULATE FILTER OF A DIESEL ENGINE WITH A RAIL INJECTION SYSTEM

TECHNICAL FIELD

The present invention relates to a method of automatically initiating regeneration of a particulate filter of a diesel engine with a rail injection system.

BACKGROUND ART

As is known, to safeguard the environment, increasing effort is being made, and in many countries tighter restrictions are being imposed, to control the exhaust of internal combustion engines.

As regards diesel engines in particular, the main problems are due to the presence in the exhaust gas of nitric oxides ($NO_x$) and particulates, as opposed to a very low content of carbon monoxide (CO) and hydrocarbons (HC).

To minimize the particulate content of exhaust gas, some systems feature, along the exhaust line, a filter for retaining the unburned particles of which the particulate is composed, and which must therefore be cleaned ("regenerated") periodically by burning off the trapped particulate.

Since combustion of the particulate is naturally initiated automatically at high temperature—around 500°–550° C.—which is only reached in particular circumstances, some filters are fitted with heating elements which are activated periodically to heat the filter to the temperature at which combustion of the trapped particulate is initiated automatically. Other systems present a catalyst for reducing the initiating temperature to roughly 350° C., which solution, however, is only effective under medium engine load conditions. In the case of prolonged low-load operation of the engine (e.g. town driving) and/or in the presence of low external temperatures (in winter), the temperature of the exhaust gas is lower than the combustion initiating temperature, so that the particulate gradually builds up on the filter, thus resulting in increased counterpressure, impaired performance, increased fuel consumption and possibly even stalling of the engine.

Moreover, in certain driving conditions, a high buildup of particulate may result in "critical" regeneration phenomena, in turn resulting in sudden, uncontrolled combustion of the particulate, heating inside the ceramic matrix of the filter, and damage to the filter itself.

A method for regenerating a particulate filter of a diesel engine according to the preamble of claim 1 is disclosed in EP-A-0 070 619, wherein a post-injection phase is carried out directly in the cylinders in the exhaust stroke so as to supply unburnt fuel to the filter. Regeneration of the filter is effected without causing a rise in the exhaust gas temperature.

DISCLOSURE OF INVENTION

It is an object of the present invention to provide a method of automatically initiating combustion of the particulate trapped in the filter, even under engine load conditions in which the exhaust gas temperature is not guaranteed equal to or above the initiating temperature of known systems.

According to the present invention, there is provided a method of automatically initiating regeneration of a particulate filter of a diesel engine comprising a main injection phase and an auxiliary post-injection phase including injection of fuel into the engine cylinders during the expansion stroke of the engine, characterized in that the injection is carried out through a rail injection system so as to generate post-injected fuel combusts causing a rise in the exhaust gas temperature of the engine.

BRIEF DESCRIPTION OF DRAWINGS

A preferred, non-limiting embodiment of the present invention will be described by way of example with reference to the accompanying drawings, in which.

BEST MODE FOR CARRYING OUT THE INVENTION

Figure 1:
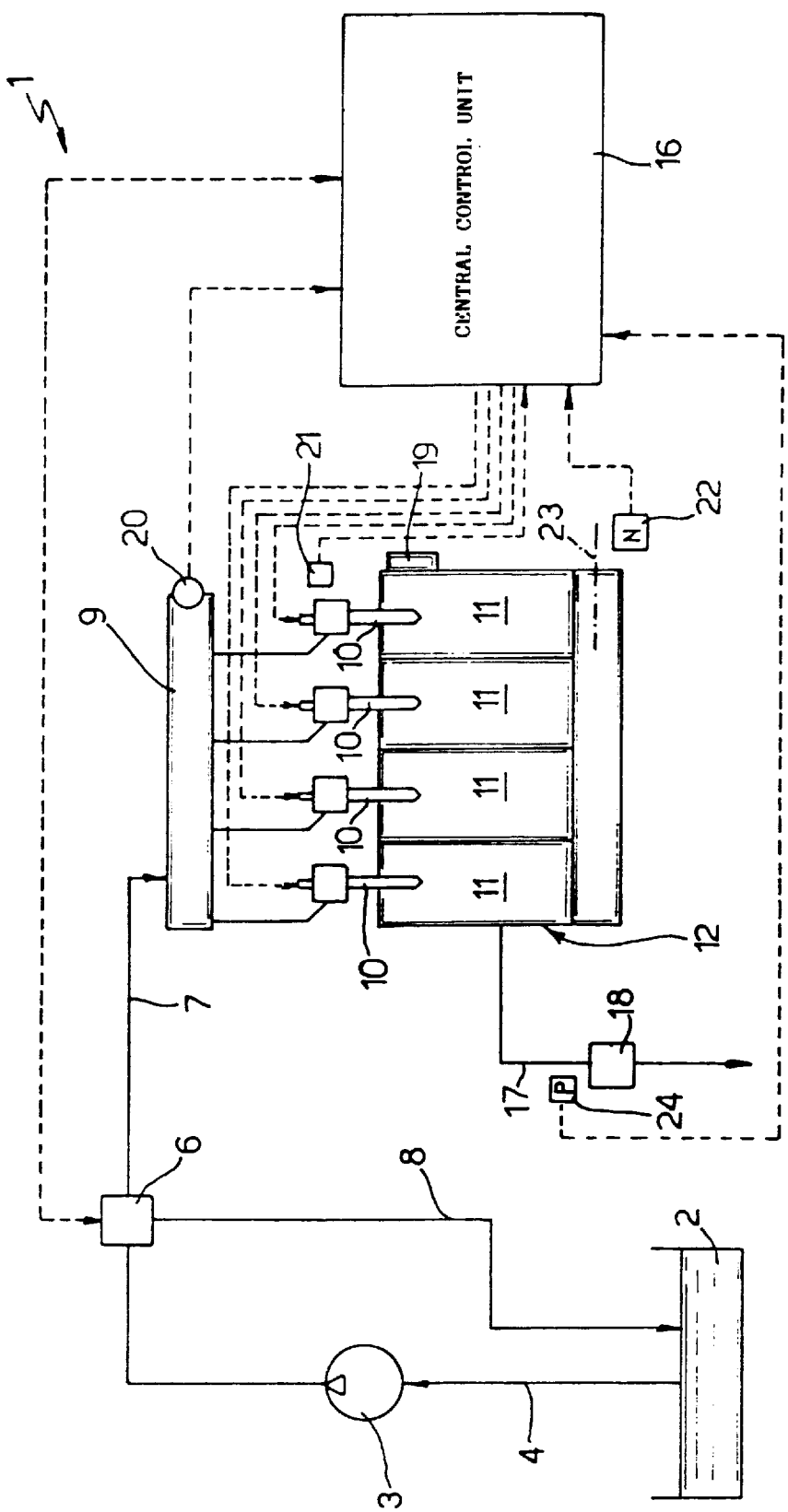
FIG. 1 shows a block diagram of a known diesel engine injection system.

FIG. 1 shows schematically a diesel engine rail injection system 1 of the type to which the present invention relates. Of system 1, only the parts pertinent to the present invention are shown, the fuel conduits being indicated by continuous lines, and the dotted lines indicating the electric lines supplying the control and measured quantity signals.

System 1 comprises:
a fuel (diesel fuel) tank 2:
a high-pressure supply pump 3 connected to tank 2 by a low-pressure conduit 4;
a pressure regulator 6 along a high-pressure line 7;
a low-pressure fuel return conduit 8 between pressure regulator 6 and tank 2;
a high-pressure fuel rail 9 connected to conduit 7 and presenting one or more elements for connection to the injectors;
a number of injectors 10—one for each cylinder 11 of engine 12—connected to rail 9;
a power control unit (central control unit) 16 for governing the system components on the basis of signals from various sensors, memorized maps, and the control strategy implemented;
a combustion product exhaust conduit 17 connected to the exhaust manifold (not shown) of engine 12;
a particulate filter 18 on exhaust conduit 17;
an intake manifold 19;
a pressure sensor 20 on rail 9;
a cycle sensor 21 on the camshaft (not shown) of engine 12;
an engine speed and stroke sensor 22 on the output shaft 23 of the engine; and
a pressure sensor 24 on exhaust conduit 17, upstream from particulate filter 18.

Pressure regulator 6, injectors 10, pressure sensor 20, cycle sensor 21, and engine speed and stroke sensor 22 are connected to central unit 16 over electric data and control exchange lines.

According to the present invention, in addition to the main injection phase controlled in the normal way by central unit 16, injection system 1 also provides for post-injecting fuel to increase the exhaust temperature of the engine and/or generate incomplete-combustion products (HC) for reducing the ignition temperature of the particulate accumulated on the filter, and so assisting low-temperature, low-engine-load regeneration of the filter.

Figure 2:
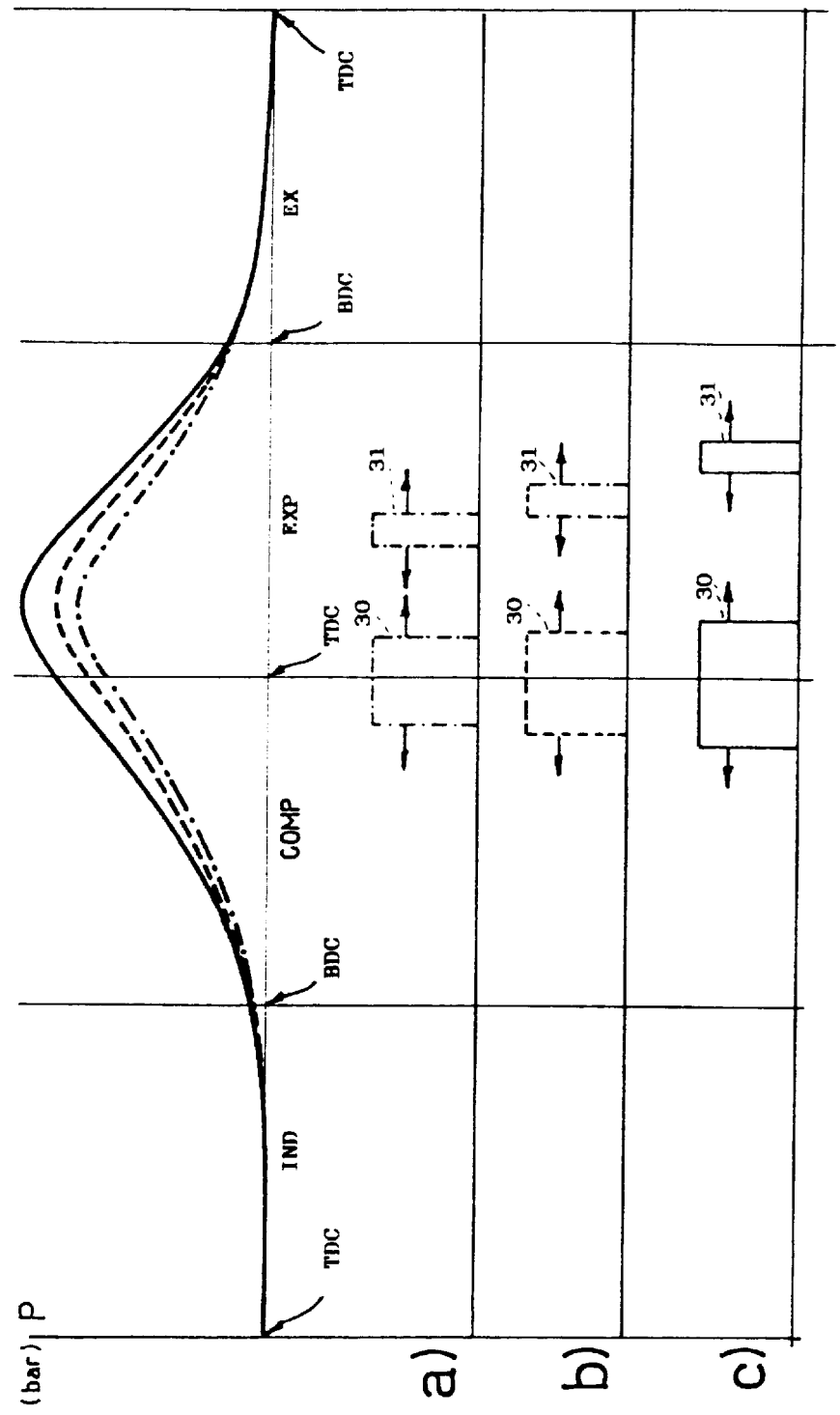
FIG. 2 shows a graph of pressure and injection, in relation to the engine strokes, according to the present invention.

The timing of the auxiliary post-injection phase is shown schematically in FIG. 2 wherein a first graph shows the pressure at the various strokes of each cylinder; a second graph shows the location of the main injection (30) and post-injection (31) phases in three different cases; TDC indicates top dead center, BDC bottom dead center, IND the induction stroke, COMP the compression stroke, EXP the expansion stroke, and EX the exhaust stroke.

The dot-and-dash curve shows injection pressure under low engine load conditions; the dash-line curve injection pressure under medium engine load conditions; and the continuous-line curve injection pressure under medium-high engine load conditions. Similarly, timing of the main injection and post-injection phases in the above three cases is shown using the same graphic means: dot-and-dash line (low load), dash line (medium load), and continuous line (high load). The arrows to the right and left of the main injection and post-injection phases indicate the possibility of location and duration varying—being advanced, delayed, lengthened or shortened—as compared with the example shown, to take into account the operating conditions of the engine, and ensure the ignition temperature of the filter at the required conditions for optimizing engine consumption.

According to the invention, the post-injection phase comprises the injection of a given quantity of fuel-air mixture directly into the cylinders during the expansion stroke EXP, when the temperature in the combustion chamber is still high enough for its combustion. For this purpose, on the basis of filter clogging values (based on the counterpressure of the filter and on engine speed and load) and predetermined algorithms, central unit 16 determines when to perform the post-injection, and possibly also timing and quantity as a function of engine load and speed.

More specifically, the start angle is directly proportional to load (as shown by curve a) in FIG. 2 relative to the lowest load) and the injected fuel quantity is inversely proportional to load. In general, post-injection may even be performed immediately following the main injection, as a single injection of a duration equal to the sum of the two; and the amount of post-injected fuel ranges from a few percent of the main injection (medium loads) to roughly 40–50% of the maximum main injection values relative to the engine speed in question.

According to one embodiment of the present invention, as opposed to being performed in all the cylinders at each cycle, post-injection is alternated from one cylinder to another at successive cycles, to balance the thermal load of the cylinders and so enable post-injection of smaller overall quantities than that which can be handled by the system with the same conditions existing in all the cylinders.

Also, depending on the operating conditions of engine 12, post-injection may be performed in a predetermined number of consecutive or nonconsecutive cycles.

Naturally, alternation of the cylinders, the post-injection enabling sequence in successive cycles, and the number of cycles in which post-injection is to be performed (overall duration) are memorized as a function of engine conditions in a storage element in or associated with central unit 16.

Post-injection may be performed in any of various ways. In a first solution, the operating load of the engine (normally already available for other processing functions) is monitored continuously to determine how long it remains below a predetermined limit value; and if the engine operates at less than full load beyond a predetermined time limit, the central unit enables the post-injection phase to initiate regeneration of the filter which is most likely clogged. In this case, the pressure sensor upstream from the filter may be dispensed with.

In a second solution, the post-injection phase is effected periodically, regardless of engine load, the premise being that, generally speaking, at low engine speed, the filter clogs after a predetermined operating time, so that initiating regeneration of the filter automatically at regular intervals ensures the filter operates under acceptable conditions. This solution is best suited to known, constant operating modes.

In a third solution, clogging of the filter is determined indirectly by monitoring, by means of sensor 24, the pressure upstream from the filter and which is correlated to the particulate buildup on the filter. In this case, central unit 16 provides for calculating clogging of the filter—normally expressed as a percentage—on the basis of a known algorithm, the variables of which also include engine speed and load, and enables the post-injection phase upon a predetermined percentage being reached.

In a fourth solution, a combined strategy is applied. Clogging of the filter is monitored as in the third solution, and, upon a predetermined threshold being reached (e.g. 80%), the central unit switches to standby awaiting the right moment in which to perform the post-injection phase, e.g. an engine load below a predetermined value, and on determining such a load, enables the post-injection phase. Naturally, in this solution also, the central control unit continues to determine that clogging remains within a maximum permissible value, and, if this is exceeded, enables post-injection regardless of the operating load, to prevent damage to the filter and to minimize fuel consumption.

With an electronic rail injection system of the type described, the post-injection phase is performed with no difficulty by virtue of injection being controlled electronically by the control signals supplied by central unit 16 to injectors 10, and timing in relation to the engine strokes being fully flexible and in no way restricted by characteristics inherent in the system.

The advantages of the present invention are as follows. In particular, it provides for regenerating the particulate filter under engine conditions which in themselves would fail to do so. Moreover, though at first sight it may appear to increase fuel consumption, this is not so, by virtue of post-injection being performed when the filter is clogged (as detected on the basis of the low-speed operating time of the engine or the pressure upstream from the filter), i.e. when fuel consumption is already increased due to the condition of the filter. As post-injection provides for regenerating and hence improving the operating conditions of the filter, the increase in consumption due to the post-injection phase is more than compensated for by the reduction achieved by improving the operating conditions of the filter.

Moreover, the method according to the invention requires no special devices or alterations to the engine or injection system, but simply software control of the injector signals, so that it may be implemented easily and cheaply on existing electronic rail injection system control units, Clearly, changes may be made to the method as described and illustrated herein without, however, departing from the scope of the present invention. In particular, and as already stated, the post-injection phase may be advanced or delayed as compared with the example shown, to ensure optimum operating conditions.

We claim:

1. A method of automatically initiating regeneration of a particulate filter of a diesel engine comprising a main injection phase and an auxiliary post-injection phase including injection of fuel into the engine cylinders during the expansion stroke of the engine, characterized in that both of said main injection phase and said auxiliary post-injection phase are carried out through a common rail injection system, said auxiliary post-injection phase generating post-injected fuel combustion causing a rise in the exhaust gas temperature of the engine.

2. A method as claimed in claim 1, characterized in that said post-injection phase is performed alternately in the engine cylinders in successive cycles.

3. A method as claimed in claim 1, further comprising the step of controlling said post-injection phase according to a memorized cycle sequence.

4. A method as claimed in claim 1, further comprising monitoring conditions of the engine, said post-injection phase being enabled upon detection of predetermined values of at least one of the engine conditions continuing for a predetermined time.

5. A method as claimed in claim 4, characterized in that said engine conditions comprise engine speed and load, and said predetermined values comprise engine speed and load falling below respective threshold values.

6. A method as claimed in claim 4, characterized in that said engine conditions comprise a degree of clogging of said particulate filter, calculated as a function of pressure upstream from said particulate filter, and of engine speed and load; and said predetermined values comprise said degree of clogging exceeding a respective threshold value.

7. A method as claimed in claim 1, characterized in that said post-injection phase is enabled at predetermined operating time intervals.

8. A method as claimed in claim 1, characterized in that said post-injection phase comprises the injection of a quantity of fuel as a function of engine load and speed.

9. A method as claimed in claim 1, characterized in that said post-injection phase is delayed as a function of engine load and speed, in relation to said main injection phase.

10. A method as claimed in claim 2, further comprising the step of controlling said post-injection phase according to a memorized cycle sequence.

11. A method as claimed in claim 5, characterized in that said engine conditions further comprise a degree of clogging of said particulate filter, calculated as a function of pressure upstream from said particulate filter, and of engine speed and load; and said predetermined values further comprise said degree of clogging exceeding a respective threshold value.

12. A method of automatically initiating regeneration of a particulate filter in an exhaust line downstream of a diesel engine, said diesel engine having at least one cylinder and having a conventional rail injection system which injects a first quantity of diesel fuel into said at least one cylinder during a main injection phase, said method comprising:

injecting a second quantity of diesel fuel into said at least one cylinder via said conventional rail injection system in an auxiliary post-injection phase, said second quantity of diesel fuel being injected during the expansion stroke of the engine when the temperature in the combustion chamber is high enough for combustion such that said second quantity of diesel fuel combusts to raise the temperature of exhaust gas supplied to said particulate filter.

13. A method according to claim 12, wherein said post-injection phase is performed alternately in the at least one cylinder in successive cycles.

14. A method according to claim 12, further comprising the step of controlling said post-injection phase according to a memorized cycle sequence.

15. A method according to claim 12, further comprising monitoring conditions of the engine, said post-injection phase being enabled upon detection of predetermined values of at least one of the engine conditions continuing for a predetermined time.

16. A method according to claim 15, wherein said engine conditions comprise engine speed and load, and said predetermined values comprise engine speed and load falling below respective threshold values.

17. A method according to claim 15, wherein said engine conditions comprise a degree of clogging of said particulate filter, calculated as a function of pressure upstream from said particulate filter, and of engine speed and load; and said predetermined values comprise said degree of clogging exceeding a respective threshold value.

18. A method according to claim 12, wherein said post-injection phase is enabled at predetermined operating time intervals.

19. A method according to claim 12, wherein said post-injection phase comprises the injection of a quantity of fuel as a function of engine load and speed.

20. A method according to claim 12, wherein said post-injection phase is delayed, as a function of engine load and speed, in relation to said main injection phase.

* * * * *